Oct. 25, 1932.  F. O. SNOW, JR  1,884,323
COUPLING BAR
Filed May 25, 1928

Inventor;
Frederick O. Snow Jr.
by Emery, Booth, James & Varney
Attys.

Patented Oct. 25, 1932

1,884,323

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

COUPLING BAR

Application filed June 25, 1928. Serial No. 287,951.

This invention aims to provide a simple and strong coupling bar for tractors, and in the accompanying drawing is shown merely for illustrative purposes one embodiment of the invention, wherein.

Figure 1:
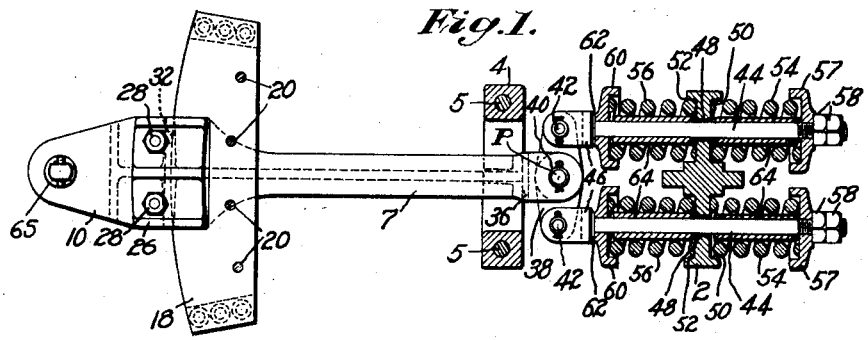
Fig. 1 is a plan section of the coupling bar taken substantially on the line 1—1 of Fig. 2.
Figure 2:
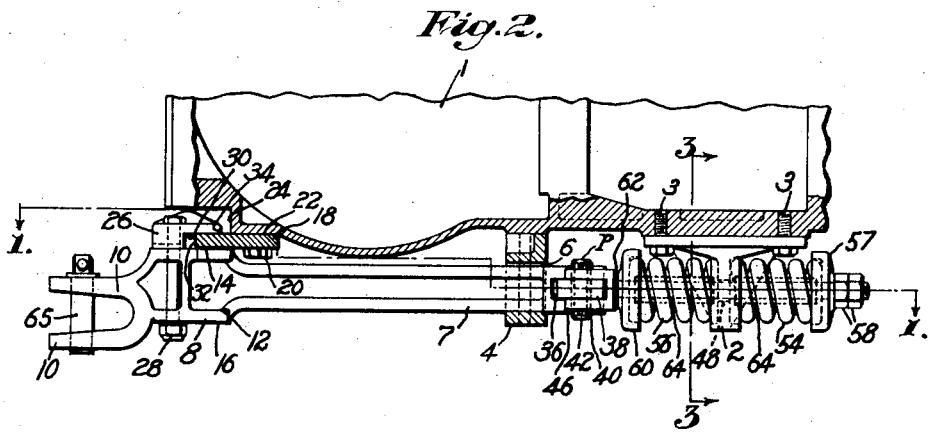
Fig. 2 is a vertically longitudinal section of the same.
Figure 3:
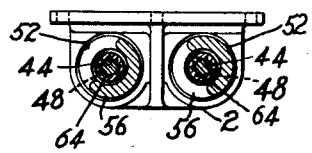
Fig. 3 is a transverse section taken on the line 3—3 of Fig. 2.

In the particular embodiment of the invention selected for purposes of illustration and shown in the drawing a portion of the tractor frame herein the rear axle and transmission housing 1 is shown provided with a depending bracket 2, secured by screws 3 to said housing. A second bracket 4 spaced from the bracket 2 is also secured herein by screws 5 to the underside of said housing 1, and this bracket is provided with a laterally elongated slot 6 through which projects the stem 7 of a coupling bar 8.

The stem 7 of said coupling bar has a limited sliding movement longitudinally in said bracket 4 for the purpose hereinafter described, and the rear end of said coupling bar also is arranged to swing laterally of the tractor in the slot 6.

The coupling bar 8 is also provided with a coupling jaw 10 that is herein offset vertically with relation to the medial axis of said coupling bar in order to provide for a limited vertical adjustment of the jaw 10 relatively to the body of the bar, which adjustment may be effected by inverting said bar.

In close proximity to the jaw 10 of said coupling bar is an enlargement 12 provided with upper and lower finished or relatively smooth faces 14 and 16, one of which faces is arranged to slide laterally against a segmental guide plate 18 secured by screws 20 to a step 22, desirably forming a part of the underside of the housing 1. The guide plate 18 projects rearwardly for a portion of its width beyond the rear face 24 of said step 22, and this projecting portion serves as a support for a tongue 26 secured preferably by bolts 28 against the upper face of the enlarged portion of said coupling bar and herein against the face 14. The tongue 26 is directed forwardly of the coupling bar to overlie the projecting portion of said plate 18, and is recessed at 30 to clear the edge of said plate 18, providing sufficient clearance for said tongue to swing laterally of the tractor along the rearward edge of said plate 18 and also to move slightly longitudinally of the coupling bar, said tongue constituting the supporting and guiding means for the jaw end of said coupling bar. The shoulder 30 is normally spaced from the rear edge 32 of said segmental guide plate 18, which latter is curved on an arc the radius whereof has a center coincident with the pivotal center $p$ of said coupling bar. The shoulder 24 of the step 22 is also normally spaced far enough from the forward end 34 of said tongue 26 to provide for said limited longitudinal movement of said coupling bar relatively to the housing 1 and relatively to the segmental plate 18 and slotted guide 4. This longitudinal movement of the coupling bar is provided to allow buffer means to be inserted to resist movement of said coupling bar in opposite directions, that is, when the tractor to which this coupling bar is attached is moving forwardly or rearwardly, thus cushioning the action of the tractor upon its load.

To this end, the forward end of the stem of the coupling bar is forked at 36 and receives between the edges thereof an equalizing member 38, which is pivoted to said forked end by a pin 40. The axis of the pin 40 is, in the present example, located slightly forward of the transverse slotted guide member 4, and constitutes the pivoted point for the coupling bar. The equalizer bar 38 extends transversely of the stem of the said coupling bar, and is pivotally connected at opposite ends by pins 42 with longitudinally extending rods 44 provided with forked heads 46 which straddle the ends of said equalizing bar 38, and extend forwardly in sliding relation with said bracket 2 through holes 48. The bracket 2 is recessed in its front and rear faces at 50 and 52 surrounding the holes 48 to provide positioning seats for springs 54 and 56 which encircle said rods 44 respectively on opposite sides of the bracket.

The springs 54, at their forward ends, engage respectively collars 57, which collars are held in the desired relation to the bracket 2 by nuts 58 having screw-threaded engagement with the rods 44. A second collar 60 is seated upon each rod 44 on the opposite side of the bracket 2 from the collars 57 and these second collars engage the ends of the springs 56 also seating against shoulders 62 formed by the forked heads of said rods. A sleeve 64 encircles each rod 44 between the bracket 2 and the collars 57 and 60, and are just the right length to permit a certain amount of compression of the springs 56 before the ends of the said sleeve seat positively against the collars 57 and 60 and said bracket 2.

By reason of the aforesaid buffer construction including parallel springs and connections therefor, the space occupied perpendicularly by said buffer means will be relatively small, two springs serving to receive the backing thrust of the tractor and two springs receiving the drawing tension of the same. The coupling jaw is provided with a coupling pin 65 arranged to be removed to receive the eye of the vehicle that is being drawn or pushed, thus providing a loose connection between the two vehicles, viz, the tractor and its trailer.

Oftentimes, the link on the trailing vehicle varies in height, but by offsetting the jaw of the coupling bar and arranging the tongue 26 so that it may be detached and reversed with respect to the finished surfaces herein the surfaces 14 and 16, said coupling jaw may be raised or lowered relatively to the segmental plate 18.

The invention is not limited to the specific embodiment shown.

I claim:

1. The combination with a housing, a guide member depending from said housing, a pair of rods arranged to slide in said guide member with their longitudinal axes approximately in the same horizontal plane, abutments on each rod on opposite sides of said guide member, springs interposed between each abutment and the adjacent face of said guide member for yieldingly resisting sliding of said rods in opposite directions, an equalizing member connecting said rods, an invertible coupling member having a portion for connection to said equalizing member and having a coupling connection part offset from said portion in a vertical plane, and means for detachably connecting said portion of said coupling member to said equalizing member for swinging movement in a horizontal plane.

2. The combination with a housing, a coupling member laterally and longitudinally bodily slidable beneath said housing, and means for providing longitudinal yielding, pivotal connection for said coupling member including an equalizer pivoted to one end of said coupling member, a rod connected to each end of said equalizer and slidable in the horizontal plane of said coupling member, and yielding means to cushion the movements of each of said rods in opposite longitudinal directions.

3. A coupling having, in combination, a coupling member, an equalizer, means operatively connecting said coupling member to said equalizer at an intermediate portion of the latter for bodily swinging movement of each relative to the other, springs operatively coacting with said equalizer at opposite sides of said intermediate portion thereof for resisting swinging movement of said equalizer in either of opposite directions and for resisting longitudinal movement of said coupling member in either of opposite directions.

4. A coupling having, in combination, a coupling member, an equalizer, means operatively pivotally connecting said member to said equalizer at a portion thereof intermediate its ends for bodily swinging movement of each relative to the other, and spring means for normally maintaining said equalizer at right angles to the length of said coupling member, said spring means resisting swinging of said equalizer in either of opposite directions and longitudinal movement of said coupling member in either of opposite directions.

5. A coupling having, in combination, a coupling member, an equalizer, means operatively pivotally connecting said member to said equalizer intermediate the ends of the latter for bodily swinging movement of each relative to the other, rods pivotally connected to said equalizer adjacent the opposite end portions of the latter, said rods and coupling member being normally in parallel relation, and springs associated with said rods for resisting longitudinal movement thereof in either of opposite directions.

In testimony whereof, I have signed my name to this specification.

FREDERICK O. SNOW, Jr.